US012000565B1

(12) United States Patent
He et al.

(10) Patent No.: US 12,000,565 B1
(45) Date of Patent: Jun. 4, 2024

(54) ILLUMINATING LENS

(71) Applicants: Self Electronics Co., Ltd., Zhejiang (CN); Wanjiong Lin, Zhejiang (CN); Self Electronics USA Corporation, Norcross, GA (US)

(72) Inventors: Zuping He, Zhejiang (CN); Yuanfang Xue, Zhejiang (CN); Zhaoyong Zheng, Zhejiang (CN); Yang Qu, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 0 days.

(21) Appl. No.: 18/392,034

(22) Filed: Dec. 21, 2023

(30) Foreign Application Priority Data

Dec. 22, 2022 (CN) ........................ 202211656810.3

(51) Int. Cl.

| | |
|---|---|
| ***F21V 13/04*** | (2006.01) |
| ***F21V 5/04*** | (2006.01) |
| ***F21V 7/04*** | (2006.01) |
| ***F21Y 115/10*** | (2016.01) |

(52) U.S. Cl.
CPC ................ *F21V 13/04* (2013.01); *F21V 5/04* (2013.01); *F21V 7/04* (2013.01); *F21Y 2115/10* (2016.08)

(58) Field of Classification Search
CPC ... F21V 5/04–048; F21V 7/0025–0041; F21V 7/0091; F21V 13/00–06; F21V 13/12; F21Y 2115/10
See application file for complete search history.

(56) References Cited

U.S. PATENT DOCUMENTS

2022/0186909 A1* 6/2022 He ............................ F21S 4/28

* cited by examiner

*Primary Examiner* — Jason M Han
(74) *Attorney, Agent, or Firm* — Wang Law Firm, Inc.

(57) ABSTRACT

An illuminating lens is provided, and light passing through a lens body is emitted to a first illumination area and a second illumination area, a first optical portion is provided on the side of a main optical axis corresponding to the first illumination area; a second optical portion, which is provided to be neighboring the first optical portion and The second optical portion is provided adjacent to the first optical portion, includes a second total reflective surface; and a third optical portion is provided adjacent to the second optical portion on the other side relative to the first optical portion. The illuminating lens of the present invention converges light from a light source at different angles, realizes separate illumination effects for different irradiation surfaces near and far, and has the effect of simplifying installation and reducing costs.

13 Claims, 7 Drawing Sheets

ILLUMINATING LENS

RELATED APPLICATION

This application claims priority to a Chinese Patent Application No. CN 202211656810.3, filed on Dec. 22, 2022.

FIELD OF THE TECHNOLOGY

The present invention relates to the field of lamps, and in particular, to a lighting lens and a lighting method using the same.

BACKGROUND

In shopping malls, clothing display cabinets are not only hung with pants and clothing, but also placed above the advertising sign. When lighting such a high-height object, a light source is usually set up in front and above it, both high and low places of the light source need to achieve the lighting effect. Common light sources on the market have a single structure and relatively divergent light. For high and low distance lighting needs, it is often necessary to set up multiple light sources to illuminate different directions.

For example, as shown in FIG. 1, a clothing display lighting scene, clothing is placed on the first illumination surface 41 below the light source, which is close to the lamp and has a large illumination surface, and a promotional sign is placed on the second illumination surface 51 above the light source, which is far away from the lamp and The illumination surface is small, and the two illumination surfaces are separated up and down. For such use requirements, ordinary light sources on the market can no longer meet the needs. If multiple light sources are set up to illuminate separately, there are problems such as higher costs and complicated layout operations.

Therefore, those skilled in the art are committed to developing an illuminating lens and corresponding lamps to realize the illumination of multiple illumination surfaces through one light source and achieve better uniform illumination.

BRIEF SUMMARY OF THE TECHNOLOGY

In view of the above-mentioned shortcomings of the prior art, the technical problem to be solved by the present invention is that the existing single light source cannot properly realize the problem of illuminating multiple places.

In order to achieve the above object, the present invention provides an illuminating lens, comprising a lens body provided in a light out direction of a light source, the lens body forming a light source holding cavity, the light source being mounted on a base surface, and a main optical axis of the light source being disposed along a normal direction of the base surface and passing through the lens body, light from the light source passes through the lens body and then exits into the first illumination area and the second illumination area, respectively, and the lens body comprises a first optical portion, a second optical portion, and a third optical portion that are sequentially adjacent to each other, wherein, Optionally, the first optical part is provided on a side of the main optical axis corresponding to the first illumination area, comprising a first total reflective surface, the first total reflective surface is provided inclined outwardly with respect to the main optical axis and does not intersect with the main optical axis, and is adapted to eject a light ray that enters the first optical part outwardly into the near optical axis side of the first illumination area after being fully reflected;

Optionally, the second optical portion is provided adjacent to the first optical portion, comprising a second total reflective surface, the second total reflective surface is provided inclined outwardly with respect to the main optical axis and intersects with the main optical axis, and is adapted to eject light rays entering the second optical portion into the far optical axis side of the first illumination area after being fully reflective, and an axial distance of the second total reflective surface from the light source is greater than an axial distance of the first total reflective surface from the light source;

Optionally, the third optical portion is provided adjacent to the second optical portion on the other side relative to the first optical portion, is adapted to eject light entering the third irradiation portion to the second illumination surface after convergence.

Optionally, the first optical portion includes a first incidence surface and a first outgoing surface; the second optical portion comprising a second incidence surface and a second outgoing surface; the third optical portion comprising a third incidence surface and a third outgoing surface, Optionally, the first incidence surface, the second incidence surface, and the third incidence surface are sequentially connected to form the light source accommodating cavity.

Optionally, the first total reflection surface and the first outgoing surface are connected endwise and the first total reflection surface forms an acute angle with the first outgoing surface, and the first outgoing surface receives all of the reflected light rays from the first total reflection surface and outgoing to the near optical axis side of the first illumination area.

Optionally, the second total reflective surface is a curved surface, the second total reflective surface and the second outgoing surface are connected at the end, and the second outgoing surface receives all of the reflected rays of light from the second total reflective surface and outgoing to the far optical axis side of the first illumination area.

Optionally, the second total reflective surface has a radius of curvature that gradually increases along a direction away from the main optical axis.

Optionally, the first outgoing surface extends in a radial direction along the optical axis, and the first outgoing surface and the second outgoing surface are connected at the end and form an angle greater than or equal to 90°.

Optionally, the third incidence surface is planar or concave.

Optionally, the third outgoing surface is convex and the third outgoing surface receives all the light from the third incidence surface.

Optionally, the first illumination area and the second illumination area are provided on radial sides of the main optical axis, respectively.

A lamp includes a lamp holder, a lampshade and an LED light source arranged on the lamp holder, the lamp holder is also fixedly provided with an illuminating lens, the LED light source is disposed in a light source holding cavity, and the lens body is fixedly mounted on the lamp holder. the lampshade, the lens body and the lamp holder are elongate, the length direction of the lampshade, the lens body and the lamp holder is perpendicular to the main light axis, and the LED light source comprises a plurality of LED chips spaced apart in a circuit board along the length direction of the lamp holder.

An illuminating method which uses an illuminating lens includes the steps as follow: Illuminating a portion of light from a light source to a first irradiation surface of a first illumination area through a first optical portion and a second optical portion of said illuminating lens; irradiating a portion of the light from the light source to a second illumination surface of the second illumination area by means of a third optical portion of said illuminating lens; wherein the first irradiation surface and the second illumination surface are provided on both sides of the main optical axis, respectively. the first irradiation surface is close to the lens body and has a large irradiation surface, and the second illumination surface is far from the lens body and has a small irradiation surface.

The lighting lens of the present invention is based on the design principle that large-angle light converges through a convex lens and small-angle light adopts total reflection. It converges the light from the light source to different angles, realizing the separate lighting effects of different irradiated surfaces near and far, with the effect of simplifying the installation and reducing the cost.

BRIEF DESCRIPTION OF THE DRAWINGS

The idea, specific structure and technical effects of the present invention will be further described below in conjunction with the accompanying drawings, so as to fully understand the purpose, features and effects of the present invention.

DETAILED DESCRIPTION OF THE INVENTION

The following specific embodiments of the present invention will be described in further detail based on the accompanying drawings. It should be understood that the description of the embodiments of the present invention here is not intended to limit the protection scope of the present invention.

Figure 1:
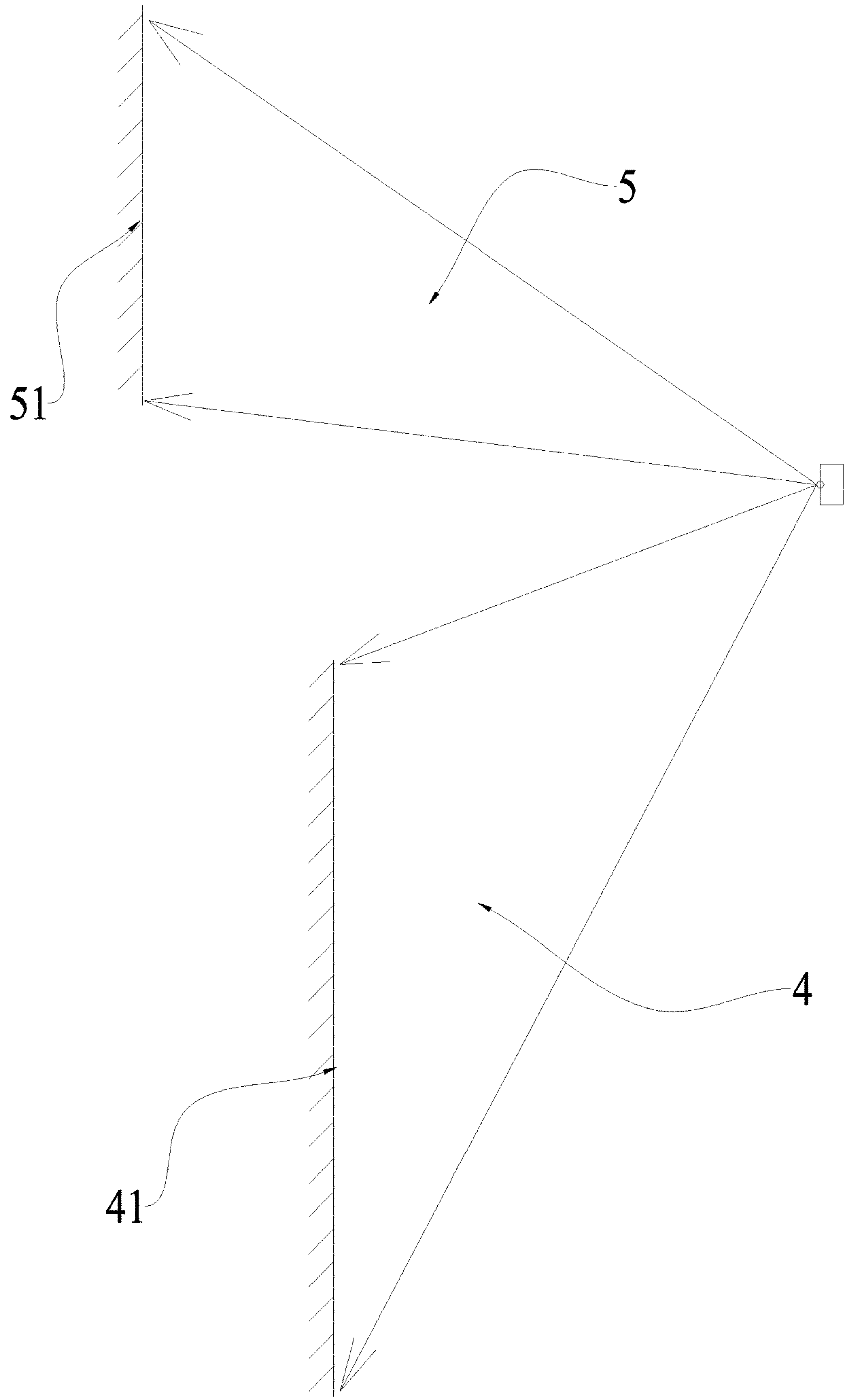
FIG. 1 is a schematic diagram of a lighting scene of the background art.
Figure 2:
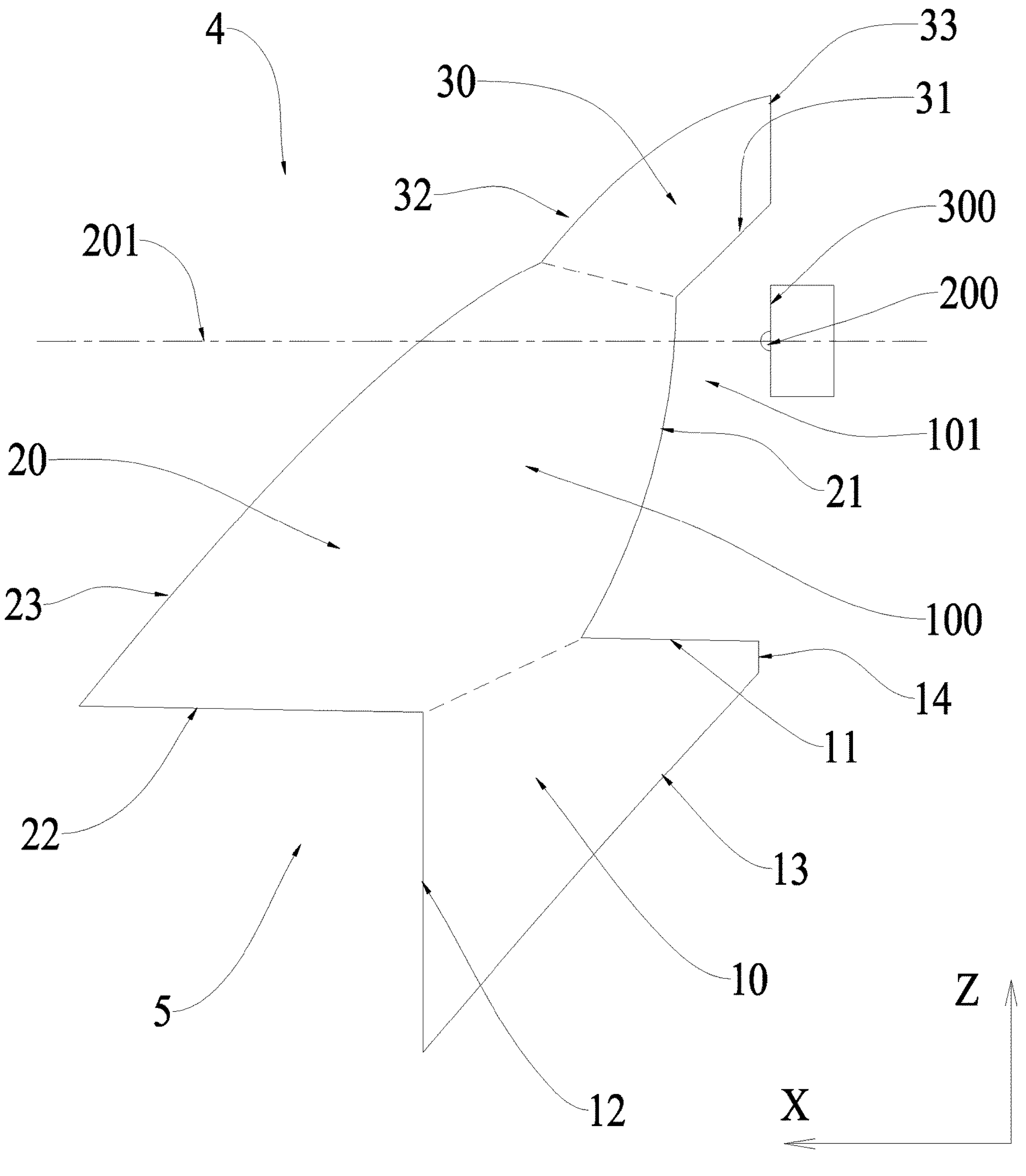
FIG. 2 is a schematic diagram of the structure of the illuminating lens of the present invention.

A specific embodiment of an illuminating lens of the present invention is shown in FIG. 2, which comprises a lens body 100, with a light source holding cavity 101 formed on a side of the lens body 100 facing a light source 200. The light source 200 is installed on the base surface 300. The main optical axis 201 of the light source 200 is along the normal direction X of the base surface 300 and passes through the lens body 100. The base surface direction Z is along the parallel direction of the base surface 300, and the normal direction X is Perpendicular to the base direction Z. Through the illuminating lens of the present invention, the light emitted by the light source 200 is incident from the side of the lens body 100 facing the light source 200. After passing through the lens body 100, it exits on the other side of the lens body 100 and exits to the first illumination area 4 and the second illumination area 5, respectively. Furthermore, the first illumination area 4 and the second illumination area 5 are respectively arranged on both sides of the main optical axis 201 in the radial direction. The illuminating lens of the present invention is suitable for illumination in the above-mentioned separated different areas.

The side of the lens body 100 facing the light source 200 and the side of the lens body 100 back to the light source 200 are connected by different surfaces. the lens body 100 is divided into a first optical portion 10, a second optical portion 20, and a third optical portion 30 which are sequentially adjacent to each other according to the intersection points between the surfaces.

The first optical portion 10 is provided on a side of the main optical axis 201 corresponding to the first illumination area 4, including a first incidence surface 11, a first outgoing surface 12, and a first total reflective surface 13, the first total reflective surface 13 is provided outwardly tilted relative to the main optical axis 201 and is not intersected with the main optical axis 201, and is adapted to eject the light that enters the first optical portion 10 into the near-optical axis side of the first illumination area 4 after fully reflecting the light. The first total reflective surface 13 is connected to an end portion of the first outgoing surface 12, and the first total reflective surface 13 forms an acute angle with the first outgoing surface 12, and the first outgoing surface 12 receives all of the reflected light rays from the first total reflective surface 13 and ejects the light rays to the near-optical axis side of the first illumination area 4.

Figure 3:
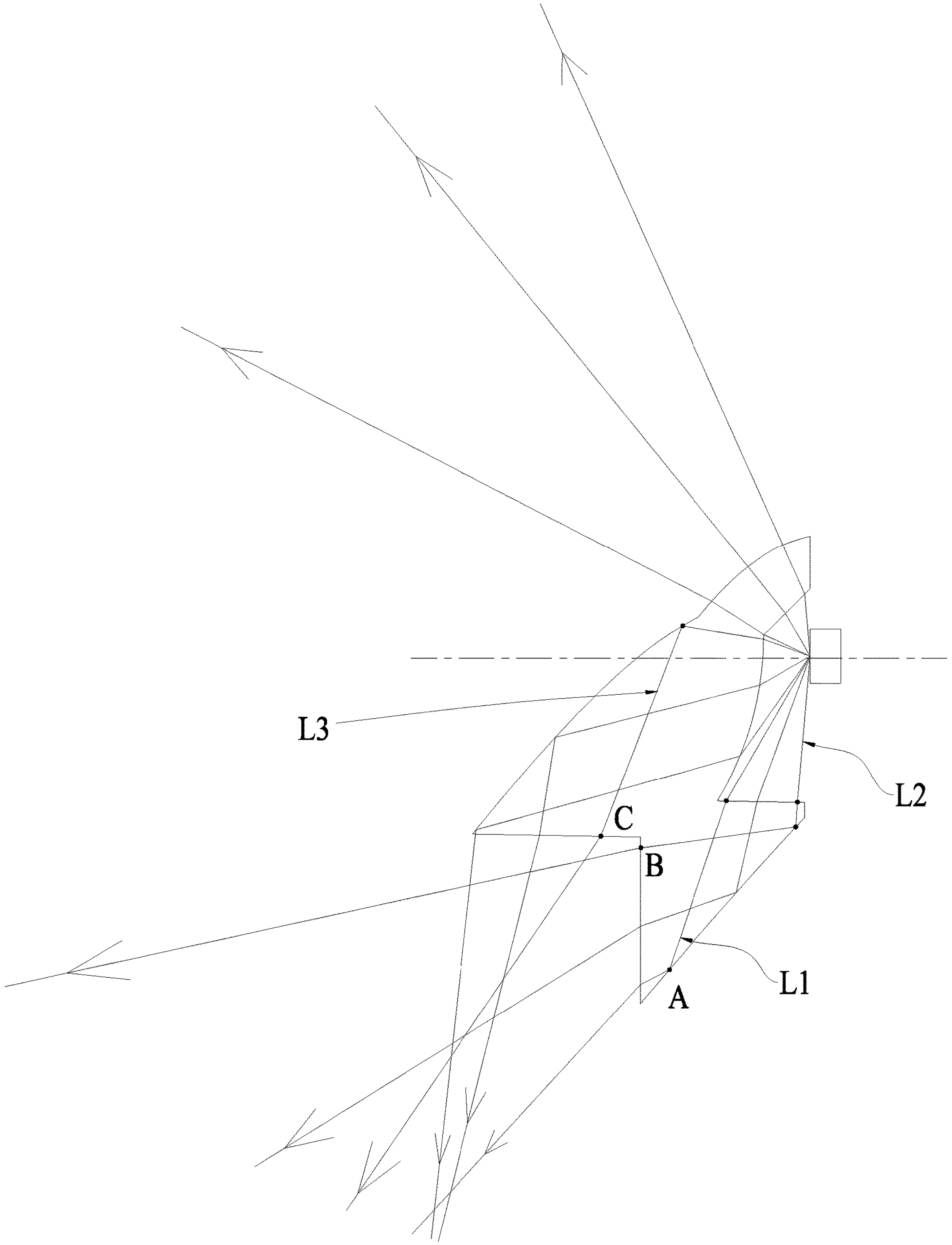
FIG. 3 is a schematic diagram (i) of the light path of the illuminating lens of the present invention.
Figure 4:
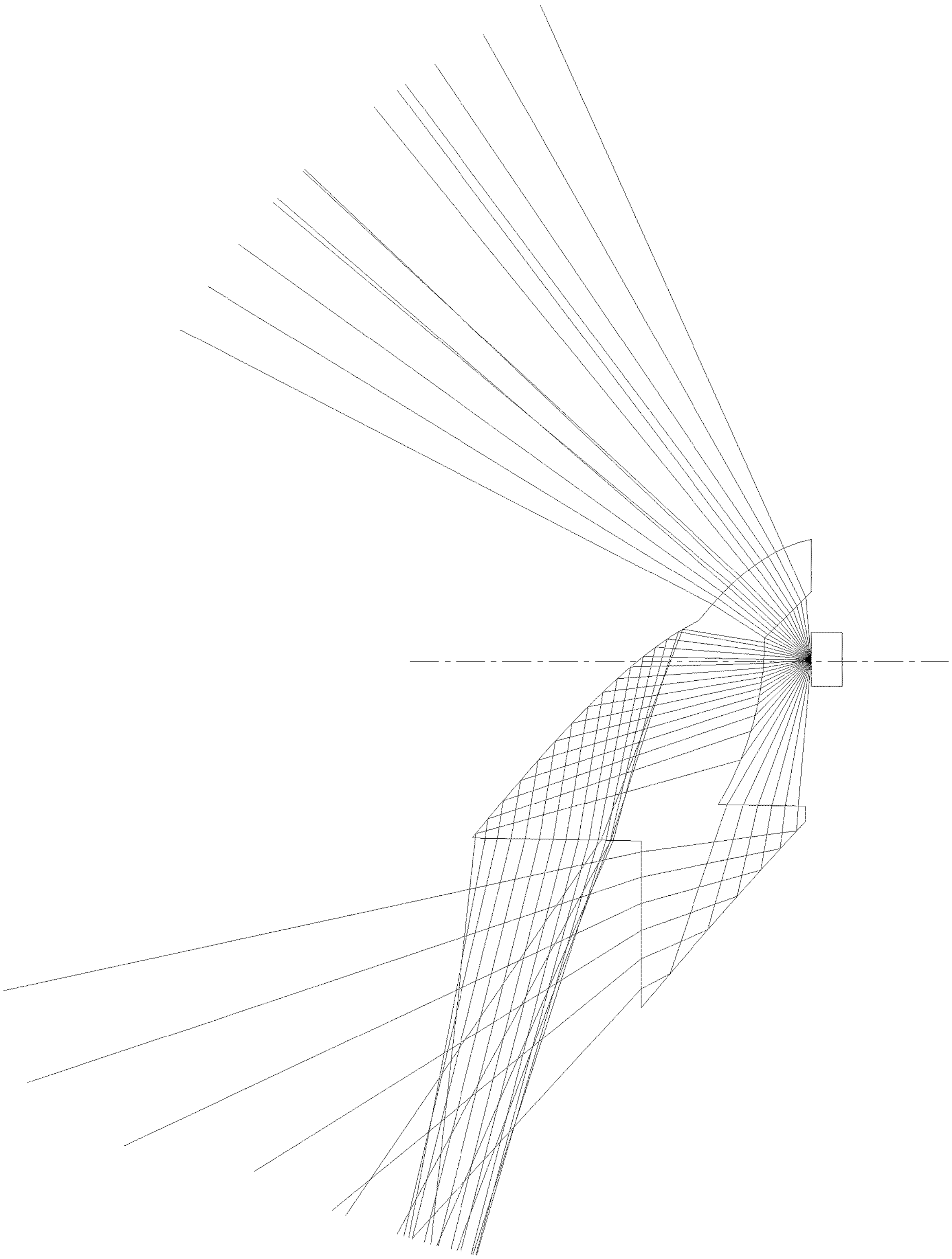
FIG. 4 is a schematic diagram (ii) of the light path of the illuminating lens of the present invention.

A schematic diagram of the light path that redistributes light from the light source 200 through the illuminating lens of the present invention is shown in FIGS. 3 and 4.

The first total reflective surface 13 needs to be long enough to be able to receive all of the incident light from the first incidence surface 11, as shown in the schematic diagram of the light path of the illuminating lens shown in FIG. 3, in the first optical portion 10, for the first light ray L1 incident from the end of the first incidence surface 11 away from the light source 200, the light ray refracted by the first incidence surface 11 intersects (intersects with point A) with the first total reflective surface 13 at the end of the first total reflective surface 13 away from the main optical axis 201, so as to enable the first total reflective surface 13 to be able to receive all of the incident light from the first incidence surface 11. The first total reflective surface 13 is optionally planar or curved, preferably planar in this embodiment.

The first outgoing surface 12 extends in a radial direction along the optical axis and is adjacent to and forms an angle with the first total reflective surface 13 at an end away from the main optical axis 201, and the length of the first outgoing surface 12 extending from the connecting end should also be sufficiently long so as to be able to receive all of the light rays from the first total reflective surface 13. As shown in the schematic diagram of the optical path shown in FIG. 3, in the first optical portion 10, for the second light ray L2 incident at the end of the first incidence surface 11 close to the light source 200, which is refracted by the first incidence surface 11 and reflected by the first total reflection surface 13, the reflected light ray is directed toward the end of the first outgoing surface 12 close to the main optical axis 201 and the reflected light ray is intersected with the first outgoing surface 12 (intersected at a B-point), at which time It is only then that the first outgoing surface 12 receives all of the reflected light rays from the first total reflective surface 13.

In this embodiment, the first incidence surface 11 and the first exit surface 12 are set as planes, and the first total reflection surface 13 forms an acute angle with the first incidence surface 11 and the first outgoing surface 12 respectively, so that the light rays emanating from the first optical portion 10 will be emanated to the near optical axis side of the first illumination area 4.

The second optical portion 20 is provided adjacent to the first optical portion 10, comprising a second incidence surface 21, a second outgoing surface 22, and a second total reflective surface 23. the second total reflective surface 23 is provided inclined outwardly with respect to the main optical axis 201 and is intersected with the main optical axis 201, and is adapted to outgoing the light that enters the second optical portion 20 into the far optical axis side of the first illumination area 4 after fully reflecting the light.

The second total reflective surface 23 is a curved surface, and at an end close to the first optical portion 10, the second total reflective surface 23 and the second outgoing surface 22 are connected at the end, and for the end of the second total reflective surface 23 close to the third optical portion 30, the third light ray L3 passing through the end, the light ray which is reflected by the second total reflective surface 23 intersects with the second outgoing surface 22 (intersects at the point C), and at this time, it is possible to make the second outgoing surface 22 receive all the reflected light from the second total reflective surface 23, The second total reflective surface 23 forms an acute angle with the second outgoing surface 22 at the point where the second total reflective surface 23 and the second outgoing surface 22 meet, and all the reflected light rays are emitted through the second outgoing surface 22 to the far optical axis side of the first illumination area 4. The axial distance between the second total reflective surface 23 and the light source 200 is greater than the axial distance between the first total reflective surface 13 and the light source 200, so that the light reflected by the second total reflective surface 23 will not interfere with the first optical portion 10.

Further, the radius of curvature of the second total reflection surface 23 gradually increases along a direction away from the main optical axis 201. In this way, for the light passing through the second total reflection surface 23, the light reflected at the above position of the second total reflection surface 23 is also gradually deflected in a direction away from the main optical axis 201 as the light reflection point gradually changes from the end close to the third optical portion 30 to the end close to the first optical portion 10. Compared with a planar structure, the second total reflection surface 23 adopts a curved structure, which can increase the deflection angle of the reflected light and is suitable for irradiating to a farther irradiation surface.

Preferably, the first outgoing surface 12 and the second outgoing surface 22 are connected at the end and formed at an angle greater than or equal to 90°. In this way, the draft angle formed above is easier to produce when molding.

The third optical portion 30 is provided adjacent to the second optical portion 20 on the other side with respect to the first optical portion 10, and is adapted to emit the light entering the third irradiation portion to the second illumination surface 51 after convergence. The third incidence surface 31 is a flat surface or a concave surface, and a flat surface is preferred in the present embodiment, and the third outgoing surface 32 is a convex surface, and the third outgoing surface 32 receives all the light from the third incidence surface 31 and emits the light after converging. As in the embodiment shown in FIG. 2, the third optical portion 30 is provided on the other side of the main optical axis 201 with respect to the first optical portion 10, and the third optical portion 30 does not intersect with the main optical axis 201.

As shown in FIG. 2, a first mounting surface 14 is transitively connected between the first incidence surface 11 and the first total reflection surface 13, and a third mounting surface 33 is transitively connected between the third incidence surface 31 and the third outgoing surface 32, and the first mounting surface 14 and the third mounting surface 33 are used for mounting and fixing the lens body 100. The first incidence surface 11, the second incidence surface 21 and the third incidence surface 31 are sequentially connected to form a light source holding cavity 101, and the light source 200 is provided in the light source holding cavity 101, and in order to reduce light leakage, the light source 200 is closer to the lens body 100 than the first mounting surface 14 and the third mounting surface 33.

Figure 5:
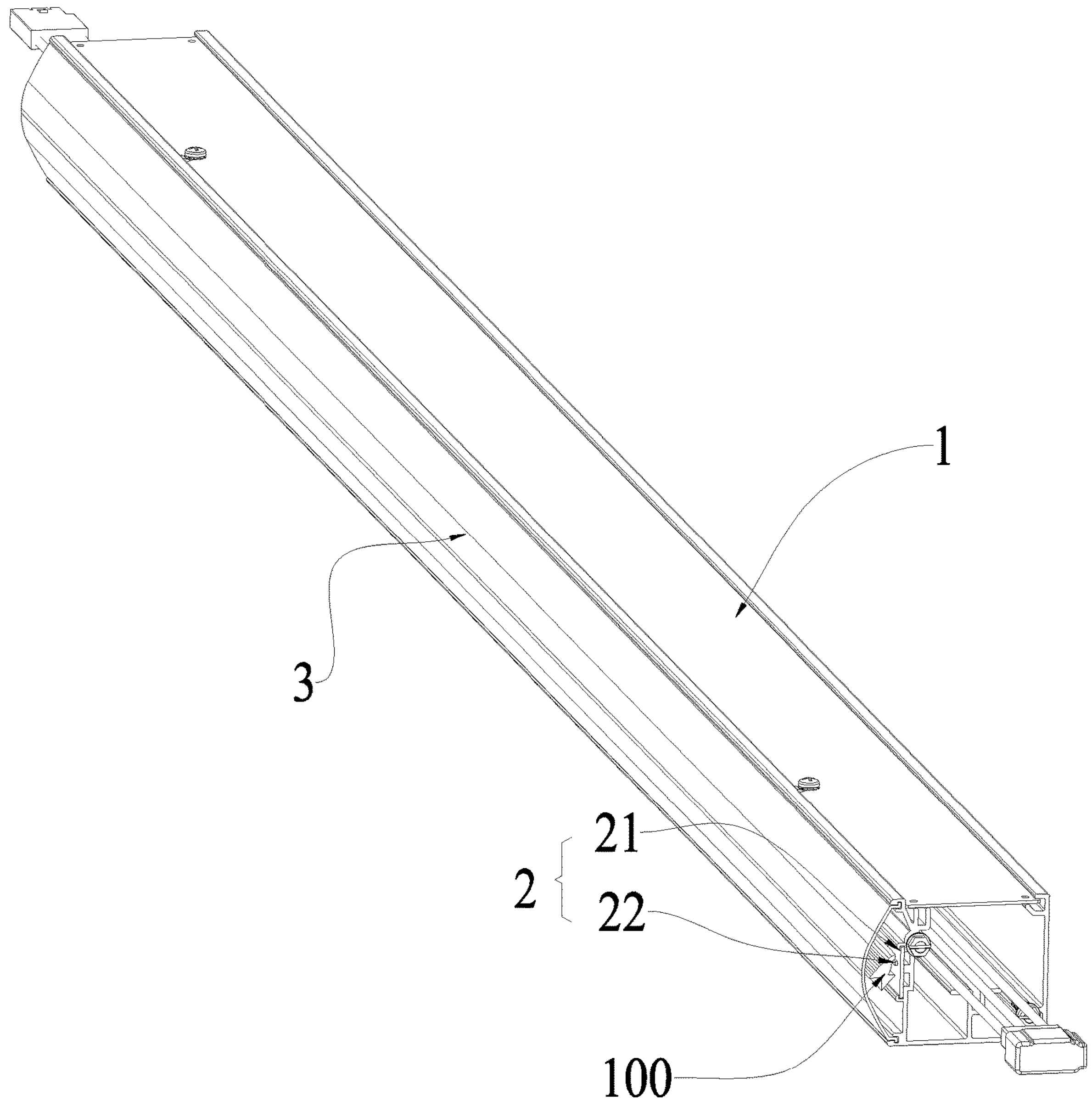
FIG. 5 is a schematic structural diagram of an embodiment of a lamp using the illuminating lens of the present invention.
Figure 6:
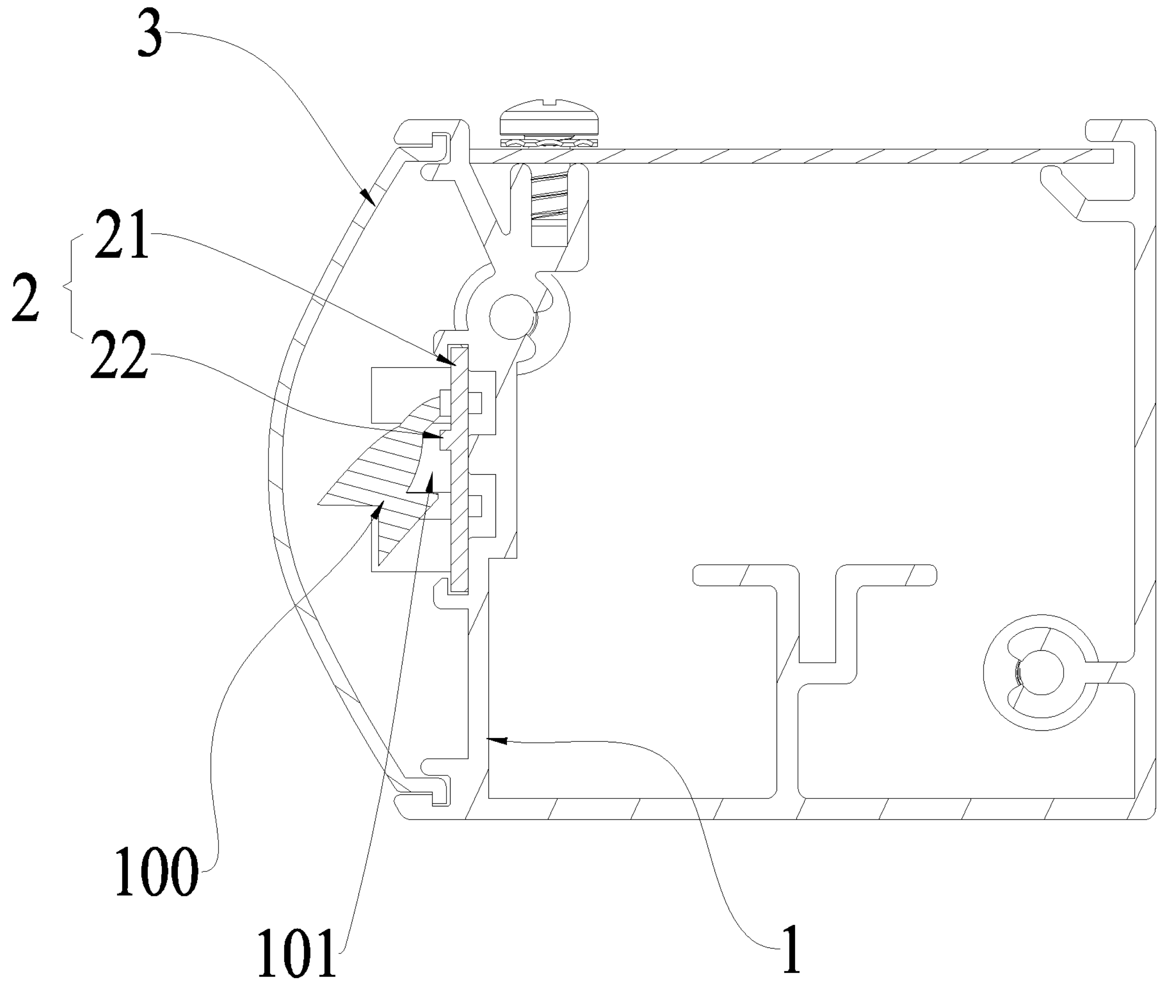
FIG. 6 is a schematic diagram of a longitudinal sectional structure of the lamp of FIG. 5.
Figure 7:
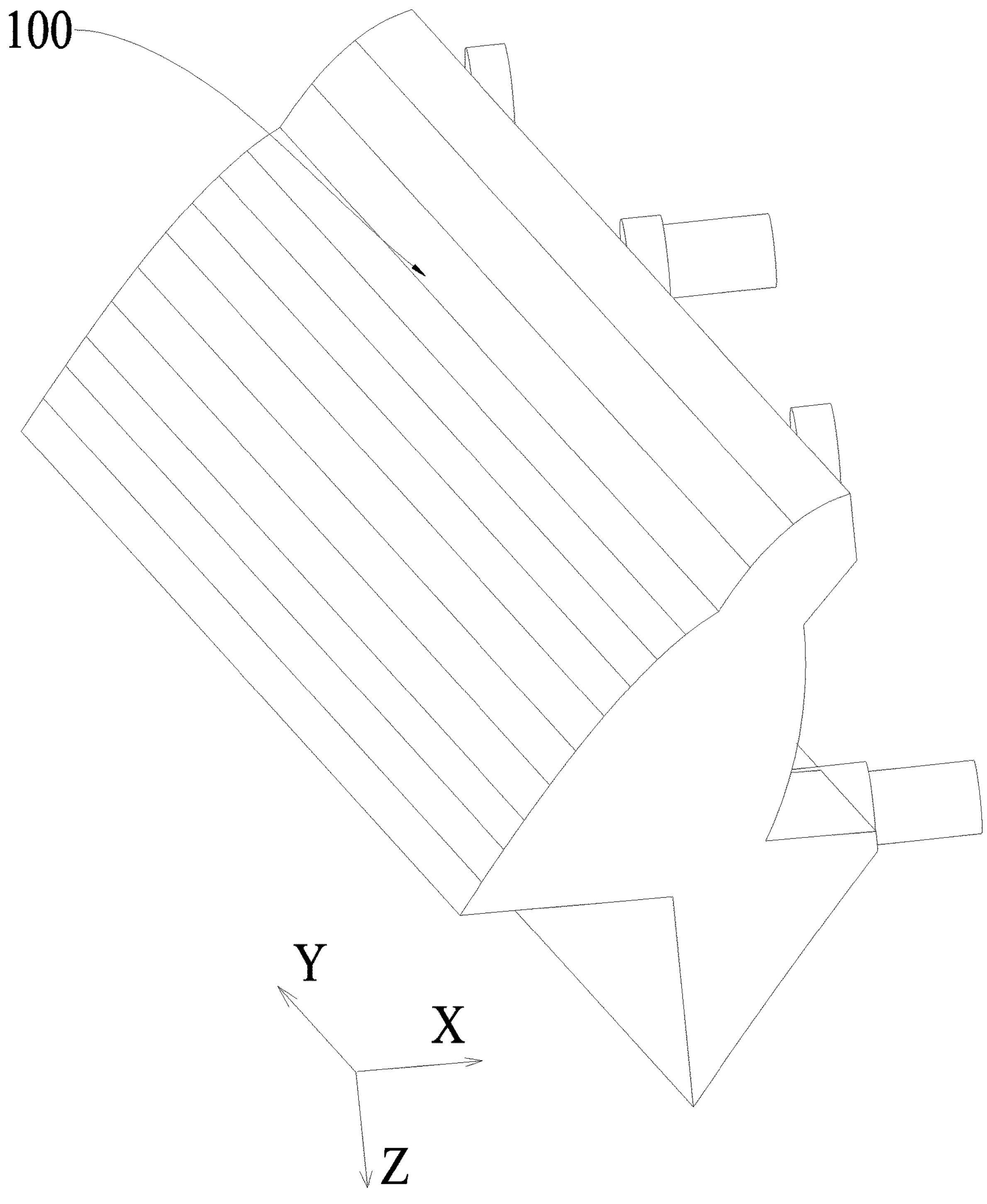
FIG. 7 is a schematic structural view of a lens body in the lamp of FIG. 5.

The present invention also provides a luminaire comprising a lamp holder 1, a lampshade 3, and a light source 200 provided on the lamp holder 1, the light source 200 is specifically an LED light source 2, as shown in FIG. 5, wherein the lamp holder 1 is also fixedly provided with an illuminating lens as described above, the LED light source 2 being provided in the light source holding cavity 101, the lens body 100 being fixedly installed through the first mounting surface 14 and the third mounting surface 33 by means of a connection member on the lamp holder 1, the lampshade 3 is provided on the outside of the lens body 100 along the light output direction. The lampshade 3, the lens body 100, and the lamp holder 1 are elongate, all extending along the length direction Y, which extension direction is perpendicular to the main optical axis 201, and the LED light source 2 includes a plurality of LED chips 220 spaced apart on the circuit board 210 along the length direction Y of the lamp holder 1. In a longitudinal section perpendicular to the length direction Y, the luminaire has a sectional structure as shown in FIG. 6. The bar structure of the lens body 100 in the luminaire is shown in FIG. 7.

When the lamp is applied in practice, for example, when it is applied to a clothing display case, the lamp holder 1 is fixedly mounted and the side on which the lampshade 3 is mounted is oriented toward the irradiation surface, and the illuminating lens of the present invention is capable of illuminating the upper and lower areas respectively, and thus is capable of uniformly illuminating the garments displayed on the lower side of the clothing display case, the advertisement billboards, etc. on the upper side.

The invention also provides an illumination method, which uses the above-mentioned illuminating lens and includes the following steps:

A portion of the light from the light source 200 is irradiated to the first irradiation surface 41 of the first illumination area 4 through the first optical portion 10 and the second optical portion 20 of the illuminating lens; and a portion of the light from the light source 200 is irradiated to the second illumination surface 51 of the second illumination area 5 through the third optical portion 30 of the illuminating lens; wherein the first irradiation surface 41 and the second illumination surface 51 are respectively provided on both sides of the main optical axis 201. The first irradiation surface 41 is close to the lens body 100 and has a large irradiation surface and a large irradiation angle, and the second illumination surface 51 is far away from the lens body 100 and has a small irradiation surface and a relatively small irradiation angle, which is realized for the first irradiation surface 41 by using a mechanism of total reflection, and for the second illumination surface 51 by using a mechanism of convergence of convex lenses.

The preferred embodiments of the present invention are described in detail above. It should be understood that those skilled in the art can make many modifications and changes based on the concept of the present invention without creative efforts. Therefore, any technical solutions that can be obtained by those skilled in the art through logical analysis, reasoning or limited experiments based on the concept of the present invention and on the basis of the existing technology should be within the scope of protection determined by the claims.

What is claimed is:

1. An illuminating lens, comprising a lens body (100) provided in a light out direction of a light source (200), the lens body (100) forming a light source holding cavity (101), the light source (200) being mounted on a base surface (300), and a main optical axis (201) of the light source (200) being disposed along a normal direction of the base surface (300) and passing through the lens body (100), characterized in that light from the light source (200) passes through the lens body (100) and then exits into a first illumination area (4) and a second illumination area (5), respectively, and the lens body (100) comprises a first optical portion (10), a second optical portion (20), and a third optical portion (30) that are sequentially adjacent to each other, wherein, the first optical part (10) being provided on a side of the main optical axis (201) corresponding to the first illumination area (4), comprising a first total reflective surface (13), the first total reflective surface (13) is provided inclined outwardly with respect to the main optical axis (201) and does not intersect with the main optical axis (201), and is adapted to eject a light ray that enters the first optical part (10) outwardly into the near optical axis side of the first illumination area (4) after being fully reflected;

the second optical portion (20) being provided adjacent to the first optical portion (10), comprising a second total reflective surface (23), the second total reflective surface (23) is provided inclined outwardly with respect to the main optical axis (201) and intersects with the main optical axis (201), and is adapted to eject light rays entering the second optical portion (20) into the far optical axis side of the first illumination area (4) after being fully reflective, and an axial distance of the second total reflective surface (23) from the light source (200) is greater than an axial distance of the first total reflective surface (13) from the light source (200);

the third optical portion (30) being provided adjacent to the second optical portion (20) on the other side relative to the first optical portion (10), is adapted to eject light entering the third irradiation portion to the second illumination surface (51) after convergence.

2. The illuminating lens as claimed in claim 1, wherein the first optical portion (10) comprises a first incidence surface (11) and a first outgoing surface (12), the second optical portion (20) comprising a second incidence surface (21) and a second outgoing surface (22), the third optical portion (30) comprising a third incidence surface (31) and a third outgoing surface (32), the first incidence surface (11), the second incidence surface (21), and the third incidence surface (31) are sequentially connected to form the light source holding cavity (101).

3. The illuminating lens as claimed in claim 2, wherein the first total reflection surface (13) and the first outgoing surface (12) are connected endwise and the first total reflection surface (13) forms an acute angle with the first outgoing surface (12), and the first outgoing surface (12) receives all of the reflected light rays from the first total reflection surface (13) and outgoing to the near optical axis side of the first illumination area (4).

4. The illuminating lens as claimed in claim 2, wherein the second total reflective surface (23) is a curved surface, the second total reflective surface (23) and the second outgoing surface (22) are connected at the end, and the second outgoing surface (22) receives all of the reflected rays of light from the second total reflective surface (23) and outgoing to the far optical axis side of the first illumination area (4).

5. The illuminating lens as claimed in claim 4, wherein the second total reflective surface (23) has a radius of curvature that gradually increases along a direction away from the main optical axis (201).

6. The illuminating lens as claimed in claim 2, wherein the first outgoing surface (12) extends in a radial direction along the optical axis, and the first outgoing surface (12) and the second outgoing surface (22) are connected at the end and form an angle greater than or equal to 90°.

7. The illuminating lens as claimed in claim 2, wherein the third incidence surface (31) is planar or concave.

8. The illuminating lens as claimed in claim 7, wherein the third outgoing surface (32) is convex and the third outgoing surface (32) receives all the light from the third incidence surface (31).

9. The illuminating lens as claimed in claim 1, wherein the first illumination area (4) and the second illumination area (5) are provided on radial sides of the main optical axis (201), respectively.

10. A lamp, comprising a lamp holder (1), a lampshade (3) and an LED light source (2) arranged on the lamp holder (1), characterized in that, the lamp holder (1) is also fixedly provided with an illuminating lens as described in claim 1, the LED light source (2) is disposed in a light source holding cavity (101), and the lens body (100) is fixedly mounted on the lamp holder (1).

11. A lamp as claimed in claim 10, wherein the lampshade (3), the lens body (100) and the lamp holder (1) are elongate, the length direction of the lampshade (3), the lens body (100) and the lamp holder (1) is perpendicular to the main light axis (201), and the LED light source (2) comprises a plurality of LED chips (220) spaced apart in a circuit board (210) along the length direction of the lamp holder (1).

12. An illuminating method which uses an illuminating lens as claimed in claim 1, comprising the steps as follow:

Illuminating a portion of light from a light source (200) to a first irradiation surface (41) of a first illumination area (4) through a first optical portion (10) and a second optical portion (20) of said illuminating lens;

irradiating a portion of the light from the light source (200) to a second illumination surface (51) of the second illumination area (5) by means of a third optical portion (30) of said illuminating lens;

wherein the first irradiation surface (41) and the second illumination surface (51) are provided on both sides of the main optical axis (201), respectively.

13. The lighting method as claimed in claim 12, wherein the first irradiation surface (41) is close to the lens body (100) and has a large irradiation surface, and the second illumination surface (51) is far from the lens body (100) and has a small irradiation surface.

* * * * *